(12) United States Patent
Fink et al.

(10) Patent No.: US 7,045,565 B2
(45) Date of Patent: May 16, 2006

(54) UV CROSS-LINKABLE MELT ADHESIVES CONTAINING STABILIZERS

(75) Inventors: Ralf Fink, Schifferstadt (DE); Karl-Heinz Schumacher, Neustadt (DE); Uwe Duesterwald, Queidersbach (DE); Ulrich Erhardt, Ladenburg (DE); Harald Meyer, Wachenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 71 days.

(21) Appl. No.: 10/484,199

(22) PCT Filed: Jul. 5, 2002

(86) PCT No.: PCT/EP02/07489

§ 371 (c)(1),
(2), (4) Date: Jan. 20, 2004

(87) PCT Pub. No.: WO03/010231

PCT Pub. Date: Feb. 6, 2003

(65) Prior Publication Data

US 2004/0167262 A1    Aug. 26, 2004

(30) Foreign Application Priority Data

Jul. 18, 2001   (DE) ............................... 101 34 261

(51) Int. Cl.
*C08K 5/13* (2006.01)
(52) U.S. Cl. ...................................... 524/351
(58) Field of Classification Search ......... 524/349–353
See application file for complete search history.

(56) References Cited

U.S. PATENT DOCUMENTS

| 4,146,521 | A | * | 3/1979 | Godfrey ..................... 524/499 |
| 4,451,633 | A | * | 5/1984 | Brownscombe et al. . 526/348.6 |
| 5,047,443 | A | * | 9/1991 | Rehmer ...................... 522/46 |
| 5,194,455 | A | * | 3/1993 | Massow et al. ............. 522/152 |
| 5,196,457 | A | * | 3/1993 | Wilkinson et al. .......... 522/103 |
| 5,326,413 | A | * | 7/1994 | Esemplare et al. ......... 156/154 |
| 5,373,041 | A | * | 12/1994 | Prejean ....................... 524/143 |
| 5,698,373 | A | * | 12/1997 | Fujikawa et al. ........ 430/288.1 |
| 6,489,384 | B1 | | 12/2002 | Fink et al. |
| 6,568,399 | B1 | * | 5/2003 | Wieczorek et al. ........... 131/90 |
| 2003/0105259 | A1 | * | 6/2003 | Heemann et al. ........... 527/600 |

FOREIGN PATENT DOCUMENTS

| DE | 1 037 079 | 8/1958 |
| DE | 2 411 469 | 9/1974 |
| DE | 38 44 444 | 8/1990 |
| EP | 0 048 071 | 3/1982 |
| EP | 0 246 848 | 11/1987 |
| EP | 0 343 467 | 11/1989 |
| JP | 03 115481 | 5/1991 |

* cited by examiner

*Primary Examiner*—Peter Szekely
(74) *Attorney, Agent, or Firm*—Oblon, Spivak, McClelland, Maier & Neustadt, P.C.

(57) ABSTRACT

A composition containing a melt-processing water-free, solvent-free polyacrylate and an anti-oxidizing agent which contains at least one aromatically bonded hydroxyl group and which is exclusively comprised of hydrogen, carbon and oxygen atoms.

12 Claims, No Drawings

UV CROSS-LINKABLE MELT ADHESIVES CONTAINING STABILIZERS

The invention relates to a composition comprising
a melt-processable substantially water- and solvent-free polyacrylate and
an antioxidant containing at least one aromatic hydroxyl group and composed exclusively of hydrogen, carbon and oxygen atoms.

UV-crosslinkable polymers and their use as adhesives, e.g., as hotmelt pressure sensitive adhesives (PSAs), are known, for example, from DE-A-2 411 169, EP-A-246 848, DE-A-4 037 079 or DE-A-3 844 444.

Stabilized hotmelt PSAs are described in the patent application DE-A-10008295, unpublished at the priority date of the present specification.

The polymers used for hotmelt adhesives are solid at room temperature and applied to the desired substrates from the melt at higher temperatures.

Required polymers are often supplied already in the fluid state (by tanker truck) and held in that state until such later time as they are processed.

At the temperatures required, there may be instances of heat-induced crosslinking, especially under an air atmosphere. It is therefore desired to add effective stabilizers which display their effect in particular under aerobic conditions.

In particular, the stabilizers must not adversely affect the performance properties in the context of subsequent use as an adhesive.

A particular problem in this context is posed by UV-crosslinkable polymers which include a photoinitiator for the subsequent UV crosslinking. The stabilizers may detract from the activity of the photoinitiator, i.e., prevent or lessen the subsequent desired UV crosslinking, and may lead to adverse performance properties, such as deficient cohesion in the adhesive film.

We have found accordingly the composition defined at the outset, its use as a hotmelt pressure sensitive adhesive, and a process for applying said adhesive to appropriate substrates.

The composition of the invention comprises a polyacrylate.

This is an addition polymer obtainable by free-radical polymerization of acrylic monomers, which are understood to include methacrylic monomers, with or without further, copolymerizable monomers.

The polyacrylate is composed preferably of at least 40% by weight, with particular preference at least 60% by weight, with very particular preference at least 80% by weight, of $C_1$–$C_{18}$ alkyl (meth)acrylates.

Mentioned may be made in particular of $C_1$–$C_8$ alkyl (meth)acrylates, examples being methyl (meth)acrylate, ethyl (meth)acrylate, n-butyl (meth)acrylate, 2-ethylhexyl (meth)acrylate.

The polyacrylate in question is preferably crosslinkable with UV light. For UV crosslinking the composition of the invention may have a photoinitiator added to it. Alternatively, the photoinitiator may be attached to the polyacrylate.

By exposure to high-energy light, especially UV light, the photoinitiator brings about crosslinking of the polymer, preferably by means of a chemical grafting reaction of the photoinitiator with a spatially adjacent polymer chain. Crosslinking may take place in particular by insertion of a carbonyl group of the photoinitiator into an adjacent C—H bond, to form a —C—C—O—H group.

The composition of the invention contains preferably from 0.0001 to 1 mol, with particular preference from 0.0002 to 0.1 mol, with very particular preference from 0.0003 to 0.01 mol, of the photoinitiator, or of the group which acts as a photoinitiator and is attached to the polymer, per 100 g of polyacrylate.

The photoinitiator comprises, for example, acetophenone, benzophenone, benzoin ethers, benzyl dialkyl ketals, or derivatives thereof.

Preferably, the photoinitiator is attached to the polyacrylate.

With particular preference, the photoinitiator has been incorporated into the polymer chain by means of free-radical copolymerization. For this purpose the photoinitiator preferably includes an acrylic or methacrylic group.

Suitable copolymerizable photoinitiators are acetophenone derivatives or benzophenone derivatives containing at least one, preferably one, ethylenically unsaturated group. The ethylenically unsaturated group is preferably an acrylic or methacrylic group.

The ethylenically unsaturated group may be attached directly to the phenyl ring of the acetophenone or benzophenone derivative. In general, there is a spacer group between the phenyl ring and the ethylenically unsaturated ring.

The spacer group may contain, for example, up to 100 carbon atoms.

Suitable acetophenone derivatives or benzophenone derivatives are described, for example, in EP-A-346 734, EP-A-377199 (1st claim), DE-A-4 037 079 (1st claim), and DE-A-3 844 444 (1st claim) and are incorporated into the disclosure content of the present specification by this reference. Preferred acetophenone derivatives and benzophenone derivatives are those of the formula

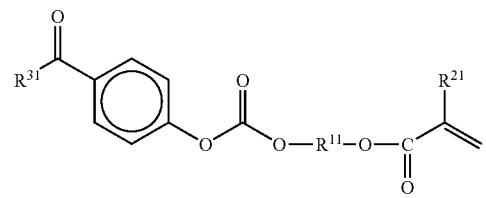

I where $R^{11}$ is an organic having up to 30 carbon atoms, $R^{21}$ is a hydrogen atom or a methyl group, and $R^{31}$ is a substituted or unsubstituted phenyl group or a $C_1$–$C_4$ alkyl group.

With particular preference, $R^{11}$ is an alkylene group, particularly a $C_2$–$C_8$ alkylene group.

With particular preference, $R^{31}$ is a methyl group or a phenyl group.

Examples of further monomers of which the polyacrylate may be composed are vinyl esters of carboxylic acids containing up to 20 carbon atoms, vinylaromatics having up to 20 carbon atoms, ethylenically unsaturated nitriles, vinyl halides, vinyl ethers of alcohols containing 1 to 10 carbon atoms, aliphatic hydrocarbons having from 2 to 8 carbon atoms and 1 or 2 double bonds, or mixtures of these monomers.

Examples of suitable vinylaromatic compounds include vinyltoluene, a- and p-methylstyrene, a-butylstyrene, 4-n-butylstyrene, 4-n-decylstyrene, and, preferably, styrene. Examples of nitriles include acrylonitrile and methacrylonitrile.

The vinyl halides are chloro-, fluoro- or bromo-substituted ethylenically unsaturated compounds, preferably vinyl chloride and vinylidene chloride.

Examples of vinyl ethers include vinyl methyl ether and vinyl isobutyl ether. Preference is given to vinyl ethers of alcohols containing 1 to 4 carbon atoms.

Hydrocarbons having from 2 to 8 carbon atoms and two olefinic double bonds that may be mentioned include butadiene, isoprene, and chloroprene.

Further suitable monomers particularly include monomers containing carboxylic, sulfonic or phosphonic acid groups. Carboxylic acid groups are preferred. Examples which may be mentioned include acrylic acid, methacrylic acid, itaconic acid, maleic acid, and fumaric acid.

Further monomers include, for example, hydroxyl-containing monomers, especially $C_1$–$C_{10}$ hydroxyalkyl (meth) acrylates, and also (meth)acrylamide.

Furthermore, mention may be made of phenyloxyethyl glycol mono(meth)acrylate, glydidyl acrylate, glycidyl methacrylate, amino (meth)acrylates such as 2-aminoethyl (meth)acrylate.

Monomers which in addition to the double bond carry further functional groups, e.g., isocyanate, amino, hydroxyl, amide or glycidyl, may improve the adhesion to substrates, for example.

The polyacrylate preferably has a K value of from 30 to 80, with particular preference from 40 to 60, as measured in tetrahydrofuran (1% strength solution at 21° C.).

The K value according to Fikentscher is a measure of the molecular weight and viscosity of the addition polymer.

The glass transition temperature (Tg) of the addition polymer is preferably from −60 to +10° C., with particular preference from −55 to 0° C., with very particular preference from −55 to −10° C.

The glass transition temperature of the polyacrylate may be determined by customary methods such as differential thermoanalysis or differential scanning calorimetry (see, e.g., ASTM 3418/82, midpoint temperature.

The polyacrylates may be prepared by copolymerizing the monomeric components using the customary polymerization initiators and, where appropriate, regulators, polymerization being carried out at the customary temperatures in bulk, in emulsion, for example, in water or liquid hydrocarbons, or in solution. The novel copolymers are preferably prepared by polymerizing the monomers in solvents, particularly in solvents with a boiling range from 50 to 150° C., preferably from 60 to 120° C., using the customary amount of polymerization initiators, which is generally from 0.01 to 10% by weight, in particular from 0.1 to 4% by weight, based on the overall weight of the monomers. Suitable solvents include especially alcohols, such as methanol, ethanol, n- and isopropanol, n- and isobutanol, preferably isopropanol and/or isobutanol, and also hydrocarbons such as toluene and, in particular, petroleum spirits with a boiling range of from 60 to 120° C. It is also possible to use ketones, such as acetone, methyl ethyl ketone, and methyl isobutyl ketone, and esters, such as ethyl acetate, and mixtures of solvents of said types, preference being given to mixtures containing isopropanol and/or isobutanol in amounts of from 5 to 95% by weight, in particular from 10 to 80% by weight, preferably from 25 to 60% by weight, based on the solvent mixture employed.

In the case of solution polymerization, examples of suitable polymerization initiators include azo compounds, ketone peroxides, and alkyl peroxides.

Following the polymerization in solution, the solvents may if desired be separated off under reduced pressure, operating at elevated temperatures in the range, for example, of from 100 to 150° C. The polymers may then be used in the solvent-free stage, i.e. as melts. In some cases it is also of advantage to prepare the novel UV-crosslinkable addition polymers by polymerization in bulk, i.e., without the use of a solvent. In this case it is possible to operate batchwise or continuously, in accordance, for example, with the information in U.S. Pat. No. 4,042,768.

The polyacrylates used in the composition of the invention are substantially water- and solvent-free. A residual amount of solvents, e.g., organic solvents and/or water, of below 2 parts by weight, in particular below 1 part by weight, with particular preference below 0.5 part by weight, with very particular preference below 0.2 part by weight, relative to 100 parts by weight of polyacrylate, however, is tolerable.

Besides the polyacrylate, the composition of the invention includes an antioxidant containing at least one aromatic hydroxyl group, particularly a hydroxyl group attached to a phenyl group, and being composed exclusively of hydrogen, carbon and oxygen atoms. In particular, from 1 to 3 such hydroxyl groups may be present.

Preferred antioxidants have a $C_1$–$C_6$ alkyl group, preferably a tertiary-butyl group, in both positions ortho to at least one of the aromatic hydroxyl groups.

Particular examples of such antioxidants are those of the formula

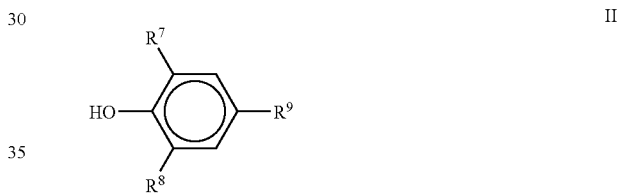

II where $R^7$, $R^8$ and $R^9$ independently are a $C_{1-6}$ alkyl group. With particular preference, $R^7$ and $R^8$ are a tertiary-butyl group and $R^9$ is a $C_1$–$C_4$ alkyl group; with very particular preference, $R^9$ is a methyl group. Particular preference is given to the compound with $R^7$ and $R^8$=tertiary-butyl and $R^9$=methyl (available as Ralox BHT from Raschig GmbH).

Preference is further given to antioxidants containing at least one ether group. From 1 to 6 ether groups, for example, may be present.

Particularly suitable ether groups are alkoxy groups, especially $C_1$–$C_4$ alkoxy groups, and with particular preference methoxy groups. The alkoxy groups are preferably attached directly to an aromatic ring system, particularly a phenyl group, and with particular preference the phenyl groups to which the above hydroxyl groups are also attached.

Preferred antioxidants therefore include chemical compounds with the formula

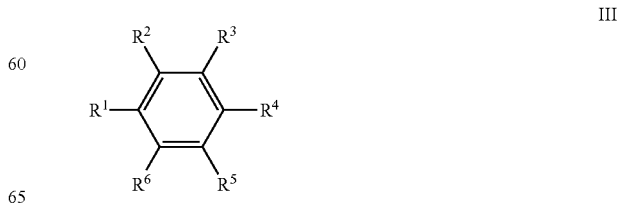

III where at least one, preferably one, of radicals $R^1$ to $R^6$ is a hydroxyl group and at least one, preferably one, of radicals $R^1$ to $R^6$ is an ether group of the formula

   IIIa or

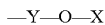   IIIb where X is a monovalent hydrocarbon group which may be substituted or interrupted by hydroxyl, ester or further ether groups and has a molar weight of up to 1000 g/mol and Y is a divalent hydrocarbon group which may likewise be substituted or interrupted by hydroxyl, ester or further ether groups and has a molar weight of up to 500 g/mol and the other radicals $R^1$ to $R^6$ are each independently a hydrogen atom or a $C_1$ to $C_6$ alkyl group.

A preferred case are ether groups of the formula IIIa in which X is an alkyl group, particularly a $C_1$–$C_4$ alkyl group, with particular preference a methyl group, in which case IIIa corresponds to an alkoxy group, particularly a methoxy group (see above). In this case, in particular, only one of the radicals $R^1$ to $R^6$ is a hydroxyl groups, 1 or 2 are an alkoxy group, particularly methoxy group, and the remaining radicals $R^1$ to $R^6$ are each independently a hydrogen atom or a $C_1$ to $C_6$ alkyl group, including in particular tert-butyl groups (preferably positioned ortho to the hydroxyl group).

The following compound may be given by way of example:

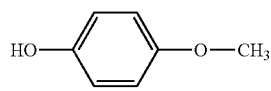

Methoxyphenol (MeHQ)

A preferred case for ether groups IIIb are ether groups in which Y is an alkylene group, particularly a $C_2$–$C_6$ alkylene group, which is interrupted by an ester group

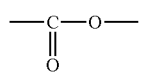

and X is an alkylaryl group, it being possible for the alkyl group likewise to be interrupted by ether or ester groups and for the aryl group to be substituted by hydroxyl or alkyl groups, especially $C_1$–$C_6$ alkyl groups.

For this case, the following compounds may be given by way of example:

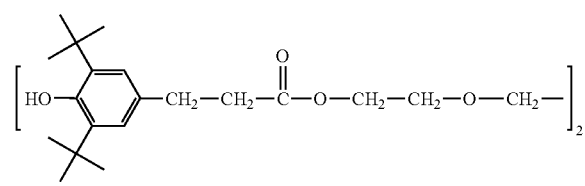

Irganox® 245 from Ciba Geigy

Very particular preference is given to antioxidants which in addition to the aromatic hydroxyl group contain an ether group and, where positioned ortho to at least one of the aromatic hydroxyl groups, there are two $C_1$–$C_6$ alkyl substituents, in particular two tertiary-butyl groups.

The antioxidant preferably comprises a low molecular weight compound having a molecular weight of below 1500 g/mol, in particular below 1000 g/mol. Also suitable, however, are polymeric antioxidants having appropriate hydroxyl groups and, where desired, ether groups.

It is also possible to use a mixture of different antioxidants.

Beside the polyacrylate and the antioxidant, the composition of the invention may also, where appropriate, comprise further additives, examples being tackifiers, such as abietic esters, other stabilizers, and plasticizers.

The amount of antioxidant in the composition is preferably from 0.001 to 3 parts by weight, with particular preference from 0.005 to 2 parts by weight, with further particular preference from 0.005 to 0.1 part by weight, and in particular from 0.01 to 0.08 part by weight, based on 100 parts by weight of polyacrylate.

The composition of the invention is suitable for producing coatings; in particular, it is suitable as a hotmelt pressure sensitive adhesive and, accordingly, for producing hotmelt PSA coatings on, for example, labels, adhesive tapes and sheets. The labels may be made, for example, from paper or synthetic materials such as polyesters, polyolefins or PVC. The adhesive tapes or sheets may likewise be made from the above synthetic materials.

To produce the coatings, the compositions of the invention may be applied, preferably in melt form, to the substrates that are to be coated.

For this purpose, the composition is preferably heated at from 60 to 200° C., in particular from 90 to 160° C., so that it is in melt form.

The melt may, if desired, be transported or stored at high temperatures, for example, from 60 to 160° C., in particular from 80 to 140° C., for several days, e.g., a week, without any thermal crosslinking being found.

Thereafter, the composition may be applied as a melt, i.e., generally at temperatures from 80 to 160° C., to substrates as mentioned above, for example.

Examples of preferred film thicknesses are from 2 to 200 µm, with particular preference from 5 to 80 µm, with very particular preference from 10 to 80 µm.

In the case of UV-crosslinkable polyacrylates, the coated substrates may then be exposed to high-energy radiation, preferably UV light, in order to effect crosslinking.

For this purpose the coated substrates are generally placed on a conveyor belt and the conveyor belt is guided past a radiation source, e.g., a UV lamp.

The degree of the crosslinking of the polymers depends on the duration and intensity of exposure.

The radiation energy is preferably in total from 100 to 1500 mJ/cm² (total UV dose measured using the UV Power Puck) of exposed surface area.

The coated substrates obtained may find application preferably as self-adhesive articles, such as labels, adhesive tapes or protective sheets.

The UV-crosslinked hotmelt pressure sensitive adhesive coatings obtained have good performance properties, such as good adhesion and high internal strength, for example. Despite the presence of the antioxidant, the polyacrylates remain readily crosslinkable with UV light.

The antioxidant prevents oxygen- and/or heat-induced crosslinking of the polyacrylates; the polyacrylates are stable on storage even under aerobic conditions.

In the following examples, acResin® DS 3532 (a UV-crosslinkable polyacrylate from BASF based on ethylhexyl acrylate and a photoinitiator of the formula I, having a glass transition temperature of −60° C.) was admixed with in each case 0.02% by weight of Irganox® 245 (a stabilizer from Ciba-Geigy), Ralox BHT (from Raschig GmbH) 4-methoxyphenol (MeHQ), and a reference antioxidant "phenol phosphoric ester", Irganox 1222, and the compositions were conditioned under an air atmosphere at 140° C. The heat-induced crosslinking process was monitored on the basis of the K value and, visually, from the fluidity: the reference sample without the addition was crosslinked after just 48 h, the same being true with the reference antioxidant "phenol phosphoric ester" (Irganox 1222). The addition of the inventive antioxidants Irganox 245, and especially the addition of MeHQ, and very particularly 2,6-di-tert-butyl-4-methylphenol (Ralox BHT), brings about a marked slowdown of the thermal crosslinking process.

| Storage time days | K value [without additive] | K value [+0.02% by weight Irganox 1222] reference antioxidant | K value [+0.02% by weight Irganox 245] | K value [+0.02% by weight MeHQ] | K value [+0.02% by weight Ralox BHT] |
|---|---|---|---|---|---|
| 0  | 54.3   | 53.0   | 53.0   | 54.5   | 46.9 |
| 2  | gelled | gelled | 53.1   | 54.3   | 47.2 |
| 4  | gelled | gelled | 54.2   | 54.9   | 47.3 |
| 8  | gelled | gelled | gelled | 54.8   | 47.1 |
| 10 | gelled | gelled | gelled | 54.5   | 47.1 |
| 12 | gelled | gelled | gelled | 55.3   | 47.3 |
| 14 | gelled | gelled | gelled | 56.1   | 47.7 |
| 15 | gelled | gelled | gelled | gelled | 48.5 |
| 16 | gelled | gelled | gelled | gelled | 49.0 |
| 17 | gelled | gelled | gelled | gelled | gelled | acResin DS 3532 was applied (20 g/m²) to a backing material (Hostaphan RN 36) and then crosslinked by means of UV light of wavelength 260–280 nm (IST-CK emitter, H spectrum 4.2 mJ/cm UV-C dose). The crosslinking achieved was examined on the basis of the shear strength (following FINAT FTM 8:10 min contact time, 25×25 mm bond area, 1 kg load, measurement of time until loaded bond fails). The same procedure was carried out with a composition additionally containing 0.02% of Ralox BHT.

| acResin DS 3532 | shear strength, 25 × 25 mm, 1 kg, 10 min contact time [hours] |
|---|---|
| no addition | about 100, adhesive fracture |
| with 0.02% by weight of Ralox BHT | about 100, adhesive fracture |

The adhesive fracture pattern also evidences the high level of cohesion, i.e., the high crosslinking and, associated with it, the high internal strength in the adhesive film.

An adhesive fracture pattern means that the crack occurs not within the adhesive film but instead at the substrate/adhesive film boundary, and that therefore there are no residues of adhesive on the substrate.

We claim:
1. A composition comprising
   a melt-processable substantially water- and solvent-free UV-crosslinkable polyacrylate and
   an antioxidant containing at least one aromatic hydroxyl group and composed exclusively of hydrogen, carbon and oxygen atoms,
   wherein in both positions ortho to the at least one aromatic hydroxyl group there is a $C_1$–$C_6$ alkyl group and wherein the polyacrylate is composed of more than 60% by weight of acrylic monomers.
2. A composition as claimed in claim 1, wherein the polyacrylate has a glass transition temperature of from -55 to -10° C.
3. A composition as claimed in claim 1, wherein the polyacrylate has a K value of from 30 to 80 as measured in tetrahydrofuran (1% strength solution at 21° C.).
4. A composition as claimed in claim 1, wherein the antioxidant also contains an ether group.
5. A composition as claimed in claim 1, wherein the antioxidant comprises chemical compounds of the formula:

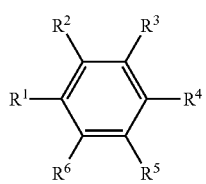

III where
at least one of the radicals $R^1$ to $R^6$ is a hydroxyl group and
at least one of the radicals $R^1$ to $R^6$ is an ether group of the formula

      IIIa or

      IIIb where X is a monovalent hydrocarbon group which may be substituted or interrupted by hydroxyl, ester or further ether groups and has a molar weight of up to 1000 g/mol and Y is a divalent hydrocarbon group which may likewise be substituted or interrupted by hydroxyl, ester or further ether groups and has a molar weight of up to 500 g/mol and the remaining radicals $R^1$ to $R^6$ are each independently a hydrogen atom or a $C_1$ to $C_6$ alkyl group.
6. A composition as claimed in claim 1, wherein the amount of antioxidant is from 0.005 to 0.1 part by weight per 100 parts by weight of polyacrylate.
7. A composition as claimed in claim 1, wherein the composition is in the melted state.
8. A hotmelt pressure sensitive adhesive comprising the composition as claimed in claim 1.
9. A process for producing coatings, especially hotmelt pressure sensitive adhesive coatings, which comprises
   a) melting a composition as claimed in claim 1 at from 60 to 200° C.,
   b) optionally, storing it as a melt at elevated temperatures,
   c) applying it as a melt to a substrate, and
   d) then exposing it to high-energy light for the purpose of crosslinking.

10. A process as claimed in claim 9, wherein at least one of steps a) to d) is conducted under aerobic conditions.

11. The composition as claimed in claim 1, wherein the $C_1$–$C_6$ alkyl group is a tertiary-butyl group.

12. The composition as claimed in claim 1, further comprising tackifiers, stabilizers or plasticizers.

* * * * *